(12) United States Patent
Pearce

(10) Patent No.: US 12,238,052 B2
(45) Date of Patent: *Feb. 25, 2025

(54) METHOD OF DETECTING INCOMPLETE INSTANT MESSAGING RECORD SETS USING SEQUENTIAL NUMBERING

(71) Applicant: William Michael Pearce, Cornwall (CA)

(72) Inventor: William Michael Pearce, Cornwall (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,103

(22) Filed: Mar. 6, 2023

(65) Prior Publication Data

US 2023/0412534 A1    Dec. 21, 2023

Related U.S. Application Data

(63) Continuation-in-part of application No. 16/399,321, filed on Apr. 30, 2019, now Pat. No. 11,601,440.

(51) Int. Cl.
*H04L 51/04* (2022.01)
*G06F 16/21* (2019.01)
*H04L 9/40* (2022.01)
*H04L 51/216* (2022.01)

(52) U.S. Cl.
CPC ............ *H04L 51/04* (2013.01); *G06F 16/219* (2019.01); *H04L 51/216* (2022.05); *H04L 63/123* (2013.01); *H04L 63/126* (2013.01); *H04L 63/1416* (2013.01); *H04L 63/1483* (2013.01)

(58) Field of Classification Search
CPC . H04L 63/126; H04L 63/123; H04L 63/1416; H04L 63/1483; H04L 51/22; G06F 16/219

See application file for complete search history.

(56) References Cited

U.S. PATENT DOCUMENTS

| | | | | |
|---|---|---|---|---|
| 6,032,258 | A * | 2/2000 | Godoroja | H04L 63/123 380/278 |
| 2007/0143407 | A1* | 6/2007 | Avritch | H04L 63/123 709/206 |
| 2013/0324085 | A1* | 12/2013 | Fratti | H04L 63/126 455/411 |
| 2014/0006778 | A1* | 1/2014 | Dixon | H04L 63/123 713/168 |

* cited by examiner

*Primary Examiner* — Nam T Tran
(74) *Attorney, Agent, or Firm* — Elias Borges

(57) ABSTRACT

Herein is disclosed a method of verifying the completeness and authenticity of instant messages sent from a first instant messaging application of a sender to a second instant messaging application of a recipient, the instant messages each having a sender's address and a user-accessible field for receiving content. The content of the user-accessible field is visible to the recipient upon opening the instant message in the second instant messaging application. The method includes the steps of identifying the receiver for an instant message to be sent by the sender, generating a current sequence marker for the receiver, inserting the current sequence marker into the user-accessible field of the instant message, and then sending the message. The current sequence marker represents a next sequence identifier in a sequence of instant messages between the sender and the receiver.

7 Claims, 1 Drawing Sheet

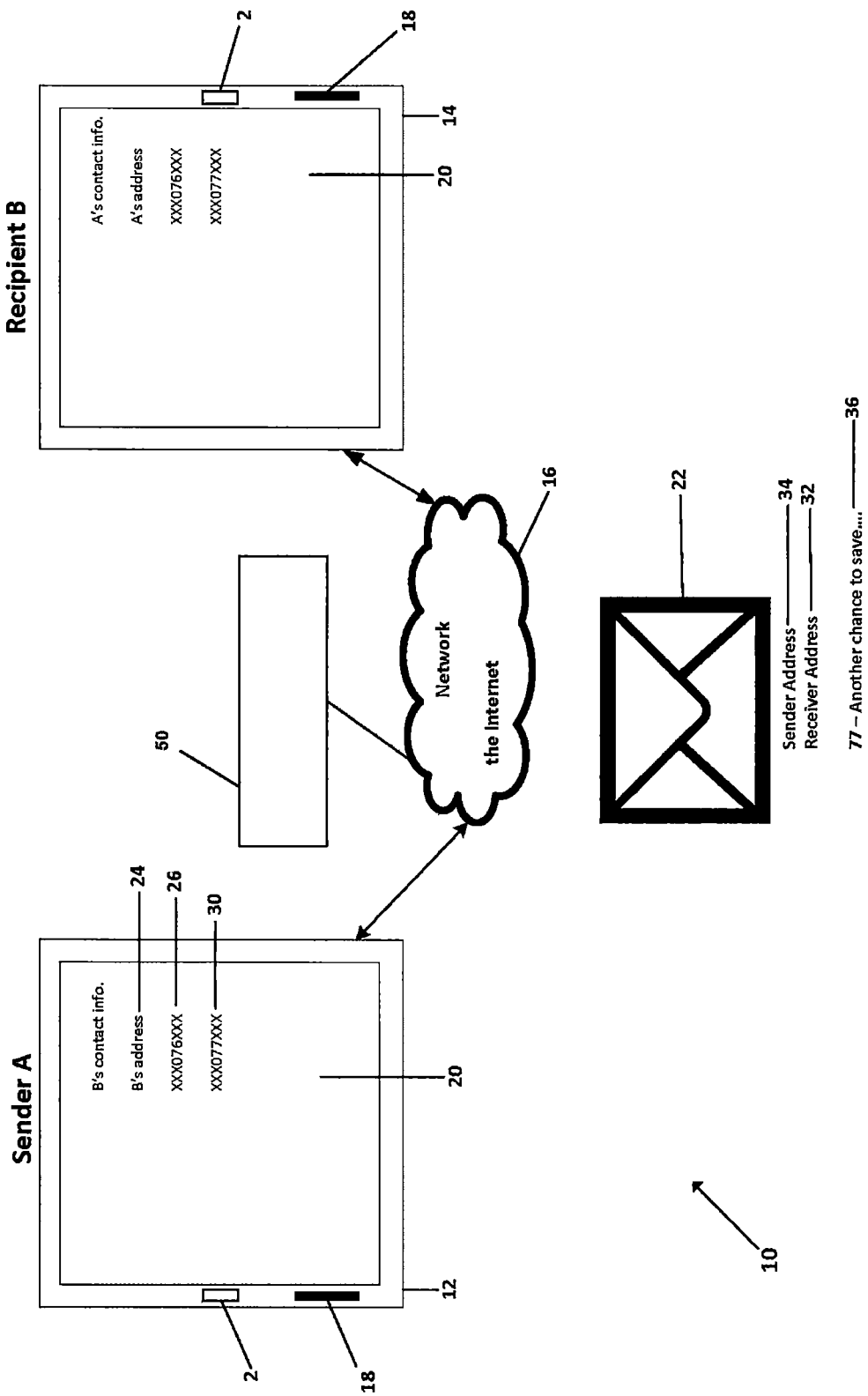

METHOD OF DETECTING INCOMPLETE INSTANT MESSAGING RECORD SETS USING SEQUENTIAL NUMBERING

CROSS-REFERENCE TO RELATED APPLICATION

This is a continuation-in-part of U.S. application Ser. No. 16/399,321 filed Apr. 30, 2019, the entirety of which is incorporated herein by reference.

BACKGROUND OF THE INVENTION

Humans have been numbering book pages for a very long time. Numbering book pages using an alphanumeric sequence assures the reader that all information has been received, and has been received in the correct order. It is beneficial for instant messaging data providers of all kinds to assist their client bases with ensuring all data in a sequence of data transmissions has been received, has been received in the correct order, and that extraneous information has not been received and intermingled with the intended data transmission. Instant messaging (IM) is a communication technology that enables people to send and receive text-based messages in nearly real time.

SUMMARY OF THE PRESENT INVENTION

Numbering electronic message records in instant messaging systems would help data providers and data receivers identify whether all information in a sequence has been received, and received in the correct order. An innovation that would assist in identifying potential missing and/or extraneous information and identifying potentially fraudulent messages in sequences of data transmissions would be a benefit for instant messaging service providers and their users. Additional instant messaging application features such as notifications, group chats, and file sharing could also benefit from an innovation that would identify potentially missing information and identify potentially fraudulent instant messages or files within the instant messaging application.

The present invention overcomes the disadvantages of the prior art by providing a method of verifying the completeness and order of instant messages transmitted in a sequence from a data provider to a data receiver by verifying the sequential history of the data elements. There are several different instant messaging standards and protocols, each with its own unique features and capabilities; however, all instant messaging systems contain elements for the destination address of the intended message recipients and a user-accessible and human-readable field, such as the body element of an instant message (RFC 6121 Extensible Messaging and Presence Protocol XMPP: Instant Messaging and Presence). Instant messages sent using other IM protocols such as SIMP, SIMPLE, IRC and other protocols also all contain elements for the destination address of the intended message recipients and a user-accessible and human-readable field container for the contents of an instant message.

The method of the present invention includes the steps of identifying the receiver for an instant message to be sent by the sender and then generating a current sequence marker for the receiver. The current sequence marker represents a next predicted sequence identifier in a sequence of messages between the sender and receiver. For example, if the sequence of messages between the sender and receiver includes 76 messages and the sequence marker is configured to be a numeric integer, then the last sequence identifier used would be 76 and the next sequence identifier (76+1 or 77) would result in the current sequence marker being 77. However, if the sequence identifiers comprise alphabetical characters (AA, AB, AC, etc.) and the last sequence identifier used was AG, then the next predicted sequence identifier would be AH, hence the current sequence marker would be AH. The next step in the method is to insert the current sequence marker into the user-accessible field of the instant message and then send the message to the recipient. Preferably the sequence marker is formed from a sequence of alphanumeric characters which are human-readable.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 1 is a schematic view of the system of the present invention showing the system of the present invention being used to send an instant message from a Sender A to a Recipient B.

In the drawings like characters of reference indicate corresponding parts in the different FIGURES.

DETAILED DESCRIPTION OF THE INVENTION

Referring to FIG. 1, the system of the present invention, shown generally as item consists of two instant-messaging-capable computing devices (instant messaging device) 12 and 14 in communication with each other via a network 16. Network 16 could be a telecom network, a local area network or the internet, but for most practical applications, network 16 is the internet. Instant messaging application 18 uses a client-server architecture. The client application runs on the user's device (such as a smartphone or a computer), while the instant messaging server application 50 runs on a remote server operated by the instant messaging service provider.

Network 16 is capable of facilitating instant messaging using 3GPP TS 23.040 or other standards or proprietary methods of transporting instant messages, that can send Sender A's message 22 using standards or proprietary methods of transporting instant messages, to Recipient B's instant messaging application 18 via Network 16 using internet protocols, an instant messaging server application 50 and standard methods or proprietary methods for transporting instant messages between different types of user devices, including computers, mobile devices such as digital cellular phones and smartphones. Network 16 can facilitate communications and data transmissions for instant messaging applications of varying types including mobile instant messaging applications, public messaging applications, private messaging applications, proprietary messaging applications, and enterprise messaging applications whether or not the particular instant messaging application 18 is purely mobile or networked in some other way and regardless of whether it uses local storage mechanisms only or client-server architecture.

Data source 20 contains data about instant messages and also contains data about the history of previously sent instant messages. It is essential that data source 20 contains the contact information of recipients and be operative for the storage and retrieval of sequence identifier 26 for each recipient.

Within the present invention, data source 20 could be operative in several forms, including (i) a traditional relational database such as Microsoft SQL Server; or (ii) a delimited text file database containing the contact information of recipients and sequence identifier 26 for each recipient; or (iii) a data file containing the contact information of recipients and sequence identifier 26 for each recipient; or (iv) a record of previously sent messages (hereinafter referred to as the "message history") stored in their native format on the instant messaging server application 50, or otherwise accessible by the server; or (v) some other record of, or copy of, the message history that contains the contact information of recipients and sequence identifier 26 for each recipient.

Regardless of whether data source 20 is a traditional database, a data file, or a message history, it is accessible by and interoperable with the other components of the present invention, as described herein.

Data source 20 includes data about the components of previously sent messages from Sender A to instant message recipients, and may also include the full or partial text and other data (e.g., multimedia data types) that comprise previously sent instant messages, including (i) message header fields such as destination address 24, and (ii) the message bodies of previously sent instant messages.

Preferably data source 20 resides on the instant messaging server 50, but regardless of where data source 20 resides, or whether data source 20 is a traditional database or another form of accessible instant message history, its purpose is to contain information about previously sent messages, including the addresses 24 of message recipients and sequence identifier 26 for each recipient, or next sequence marker 30 for each recipient, or both sequence identifier 26 and next sequence marker 30 for each recipient.

When used in the present invention, if data source 20 is an accessible message history of previously sent instant messages, the contact information of recipients and also sequence identifier 26 is retrievable or discernible. For example, by reading the message history, such as those found in a data folder of previously sent messages within instant message application 18 or located somewhere else on computing device 12, Sender A (manually) or process 2 (programmatically) could discern what the next sequence marker would be.

Sender A's computing device 12 is a network-16-enabled device such as a mobile device, a smartphone, a desktop or laptop computer, smart TV, or another type of device. Computing device 12 could be a single device, a server, or a plurality of servers and devices, and is configured as an instant message sender and uses instant message application 18, and possibly also process 2, to send instant messages to clients such as Recipient B. Instant messaging application 18 may reside on the local computing device 12 or an a local server, and may access instant messaging server application 50 or be accessible on another server via the network 16.

Computing device 12 and instant messaging application 18 also have access to a data source 20 (as a database or an accessible message history) that may reside on the local device 12, or a local server, or a local network, or somewhere within the cloud, or on the instant messaging server 50. Preferably data source 20 will reside on the instant messaging server 50, but regardless of where data source 20 resides, whether it takes the form of a traditional database or an accessible instant message history, or how data source 20 components are accessed, data source 20 is operatively coupled to instant message application 18.

In any arrangement of data source 20 (as a database or an accessible message history) and instant message application 18, computing device 12 is configured to send instant message(s) 22 from Sender A to Recipient B, and more particularly between computing devices 12 and 14 which are operated or otherwise controlled by Sender A and Recipient B respectively.

Receiver B's computing device 14 is a network-16-enabled device such as a mobile device, a smartphone, a desktop or laptop computer, tablet, smart TV, or another type of device. Receiver B's computing device 14 has access to instant message application 18 which is (i) an application such as Google's Messages, or another application like Facebook Messenger, Discord, Skype, Snapchat, WhatsApp, Signal, or Telegram that resides on computing device 14; or (ii) an internet-based or cloud-based message service such as Google Messages For Web or Apple's iMessage which is accessible by a web browser such as Google Chrome, Microsoft Internet Explorer, Mozilla Firefox, or Safari, or other browsers; or (iii) a hybrid of the foregoing two approaches.

Names of intended instant message recipients, destination address(es) 24 and other relevant information about a plurality of contacts who may be message recipients are stored in data source 20 (as a database or an accessible message history). Data source 20 is operatively coupled to sequence identifier 26. The function of sequence identifier 26 is to enumerate each instant message communication from Sender A to each of Sender A's individual recipient contacts and to maintain a component of data source 20 (as a database or an accessible message history) for each contact, such that every successive instant message from Sender A to each of its contacts is identified by the next value in a predictable sequence that is intuitively known and understood in the recipients' language and/or culture. In the example in FIG. 1, this predictable sequence consists of the standard Arabic whole numbers, and the number 76 represents the most recent sequence marker from the messages that have previously been sent from Sender A to Recipient B, and in this example the number 77 represents the next sequence marker 30 that would be used in a future instant message being sent from Sender A to Recipient B.

Since the present invention has been designed to facilitate human recognition and human convenience, in this embodiment Sender A's sequence identifier 26 for its instant message correspondence with Recipient B consists of a simple incrementing Arabic numerical sequence. (In the first instant message communication from Sender A to Recipient B, a starting message sequence identifier would have to be used. This starting sequence number could be the Arabic numeral 1 or could be another number used to start a sequence.)

Recipient B may notice that the sequence marker for the most recent instant message was 76, and that, therefore, the sequence marker for the next legitimate and expected message from Sender A should be 77.

Alternative sequences from the sender's and recipient's language and culture would also operate effectively as other embodiments within the present invention: for example, Roman numerals, an alphabet, or a sequence derived from the words to a familiar poem or song. Another embodiment may utilize multimedia data types in messages, and therefore would be able to expand the range of potential sequence markers significantly: for example, pictures or icons could be used to display a recognizable sequence.

In this embodiment of the present invention, instant message senders also use process 2, which is an application or script used in conjunction with instant message application 18 to create and send instant message to receivers.

Therefore, for the purposes of the present invention, the instant messaging application 18 that creates the characters for a user-accessible header field would execute an alternative process 2 that programmatically inserts an appropriate next sequence marker into one of the fields within the instant message. Thus, the next sequence marker 30 becomes embedded within and is part of the instant message.

Using the next sequential marker 30 means it is easier for Recipient B to quickly and more easily identify a missing instant message and request that Sender A re-send the message. The present invention assists its human users in recognizing and understanding the significance of sequence identifier 26 and sequence marker 30 (which in this embodiment are similar to page numbers). Once the human user has recognized or learned of the significance of the sequence identifier(s), no further specialized knowledge is required.

Recipient B may also be assisted in understanding that an instant message purporting to be from Sender A but that is lacking either the correct next sequence marker 30 or any sequence marker at all may be a phishing or fraud attempt and should be considered to be suspicious and worthy of further investigation. This assistance could come if some combination of instant message application 18, the instant messaging server 50, data source 20 (as a database or an accessible message history) and process 2 alerted Recipient B if the next sequential marker 30 that was received as part of instant message 22 does not match the expected sequential identifier; that is, if the sequence is out of order. Instant message application 18, interoperating with other components, could, for example, change the potentially suspicious instant message to a different colour, alert Recipient B using an on-screen message on computing device 14, or otherwise provide a notification to Recipient B that a message should be treated as a suspicious message, or that an instant message in the sequence has not been received and is missing.

In another embodiment of the present invention, namely intercepting the instant messages by the instant messaging server 50, the server application may insert the next sequence marker 30 if no sequence identifier is detected in a sender's instant message, thus providing the instant messaging service provider's user base with the means to identify and prevent missing instant messages.

In a further embodiment of the present invention, the process of the present invention could be applied to any electronic or digital message whatsoever, including any person, entity, or process(es) capable of sending digital messages and embedding the next sequence marker 30 within a user-accessible header field 36 or any other part of the message, include header fields and the body of the message. In these further embodiments of the present invention, authenticity of data sent from a data sender to a receiver is verified and data is flagged as suspicious if the expected sequence number is not received.

Users can use a sequence of numbers (or other computer-recognizable or human-recognizable sequence identifiers) to indicate the order of elements in a sequence, to identify elements in other sequences of data types besides instant messages. Numbering the elements in a sequence of data transmissions sent from a data provider to a data receiver can be useful for automated or manual fraud detection (by human overseers or anti-fraud algorithms), data analysis, verifying completeness and integrity of data, making sure no data elements in the sequences have been missed, and for audit purposes.

A specific embodiment of the present invention has been disclosed; however, several variations of the disclosed embodiment could be envisioned as within the scope of this invention. It is to be understood that the present invention is not limited to the embodiments described above but encompasses any and all embodiments within the scope of the following claims.

Therefore, what is claimed is:

1. A method of verifying the authenticity of instant messages sent from a sender to a recipient, the method comprising the steps of:

Providing a network configured to deliver instant messages between instant messaging devices, the network being operatively coupled to the internet;

Providing an instant messaging application on an instant messaging device to both the sender and the recipient, the instant messaging devices being operatively coupled to the internet;

The network and instant messaging applications configured such that the instant messages each have a sender's address and a user-accessible field for receiving content, the content of the user-accessible field being visible to the recipient upon opening the instant message in the instant message application;

Identifying the receiver for an instant message to be sent by the sender;

generating a current sequence marker for the receiver, the current sequence marker representing a next sequence identifier in a sequence of instant messages between the sender and the receiver;

inserting the current sequence marker into the user-accessible field of the instant message and then sending the instant message to the recipient, and wherein the sender queries an instant message history to generate the current sequence marker, the instant message history representing a record of instant messages previously sent from the sender to the recipient.

2. The method of claim 1 wherein the current sequence marker comprises one or more characters selected from the group of sequential characters comprising letters, numbers, words from a sequential list of words, symbols from a sequential list of symbols, icons from a sequential list of icons and images from a sequential list of images.

3. The method of claim 1 wherein the instant message history is contained in a database coupled to the first instant messaging application.

4. The method of claim 3 wherein the database and first instant messaging application are configured to programmatically generate the current sequence marker and insert it into the user-accessible field before sending the instant message.

5. The method of claim 1 wherein the instant message history includes a last sequence marker for a last instant message sent to the recipient, the sender generating the current sequence marker by incrementing the last sequence marker by 1.

6. The method of claim 5 further comprising the steps of the recipient receiving the instant message sent by the sender, the current sequence marker being identified from the instant message, the current sequence marker then being compared to an expected sequence marker predicted from the last sequence marker, the instant message being flagged as suspicious if the current sequence marker identified from the instant message does not match the expected sequence marker.

7. The method of claim 1 wherein the current sequence marker is a human-readable alphanumeric sequence of characters.

\* \* \* \* \*